(12) United States Patent
Ulbricht et al.

(10) Patent No.: US 11,315,278 B1
(45) Date of Patent: Apr. 26, 2022

(54) OBJECT DETECTION AND ORIENTATION ESTIMATION

(71) Applicant: Apple Inc., Cupertino, CA (US)

(72) Inventors: Daniel Ulbricht, Sunnyvale, CA (US); Amit Kumar K C, Sunnyvale, CA (US); Angela Blechschmidt, San Jose, CA (US); Chen-Yu Lee, Sunnyvale, CA (US); Eshan Verma, Mountain View, CA (US); Mohammad Haris Baig, San Jose, CA (US); Tanmay Batra, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 233 days.

(21) Appl. No.: 16/580,181

(22) Filed: Sep. 24, 2019

Related U.S. Application Data

(60) Provisional application No. 62/737,457, filed on Sep. 27, 2018.

(51) Int. Cl.
| | |
|---|---|
| *G06T 7/70* | (2017.01) |
| *G06T 15/04* | (2011.01) |
| *G06T 11/00* | (2006.01) |
| *G06T 15/20* | (2011.01) |
| *G06V 10/20* | (2022.01) |
| *G06V 20/64* | (2022.01) |

(52) U.S. Cl.
CPC .............. *G06T 7/70* (2017.01); *G06T 11/001* (2013.01); *G06T 15/04* (2013.01); *G06T 15/205* (2013.01); *G06V 10/255* (2022.01); *G06V 20/647* (2022.01)

(58) Field of Classification Search
CPC ......... G06T 7/70; G06T 15/205; G06T 15/04; G06T 11/001; G06K 9/3241; G06K 9/00208

See application file for complete search history.

(56) References Cited

U.S. PATENT DOCUMENTS

| | | | |
|---|---|---|---|
| 10,304,191 B1 * | 5/2019 | Mousavian | G06T 7/50 |
| 2017/0243352 A1 | 8/2017 | Kutliroff et al. | |
| 2017/0294020 A1 * | 10/2017 | Crivella | G06T 7/75 |
| 2018/0137642 A1 | 5/2018 | Malisiewicz et al. | |
| 2018/0137644 A1 | 5/2018 | Rad et al. | |
| 2019/0011999 A1 * | 1/2019 | Beach | G06F 3/0346 |
| 2019/0208177 A1 * | 7/2019 | Koyama | G06T 7/55 |
| 2019/0311546 A1 * | 10/2019 | Tay | G06T 19/006 |
| 2020/0082180 A1 * | 3/2020 | Wang | G06T 7/80 |
| 2020/0090408 A1 * | 3/2020 | Virkar | G06N 3/0454 |

* cited by examiner

*Primary Examiner* — Christopher M Brandt
(74) *Attorney, Agent, or Firm* — Fernando & Partners, LLP

(57) ABSTRACT

In one implementation, a method of estimating the orientation of an object in an image is performed by a device including one or more processors, non-transitory memory, and a scene camera. The method includes obtaining an image of a scene including a plurality of pixels at a respective plurality of pixel locations and having a respective plurality of pixel values. The method includes determining a first set of pixels locations corresponding to a 2D boundary surrounding an object represented in the image and determining, based on the first set of pixel locations, a second set of pixel locations corresponding to a 3D boundary surrounding the object.

20 Claims, 9 Drawing Sheets

OBJECT DETECTION AND ORIENTATION ESTIMATION

CROSS-REFERENCE TO RELATED APPLICATIONS

This application claims priority to U.S. Provisional Patent App. No. 62/737,457, filed on Sep. 27, 2018, which is hereby incorporated by reference in its entirety.

TECHNICAL FIELD

The present disclosure generally relates to object detection, and in particular, to systems, methods, and devices for detecting an object in an image and estimating its orientation.

BACKGROUND

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment. In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

To provide a CGR experience based on a physical environment, the position and orientation of objects within the physical environment may be determined. However, such determination can require multiple images from multiple perspectives and/or be computationally expensive. Further, other methods of object pose estimation suffer from ambiguity that may be difficult to resolve. Accordingly, to improve the CGR experience, various implementations disclosed herein estimate the orientation of an object by firstly detecting the object and secondly determining its orientation.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
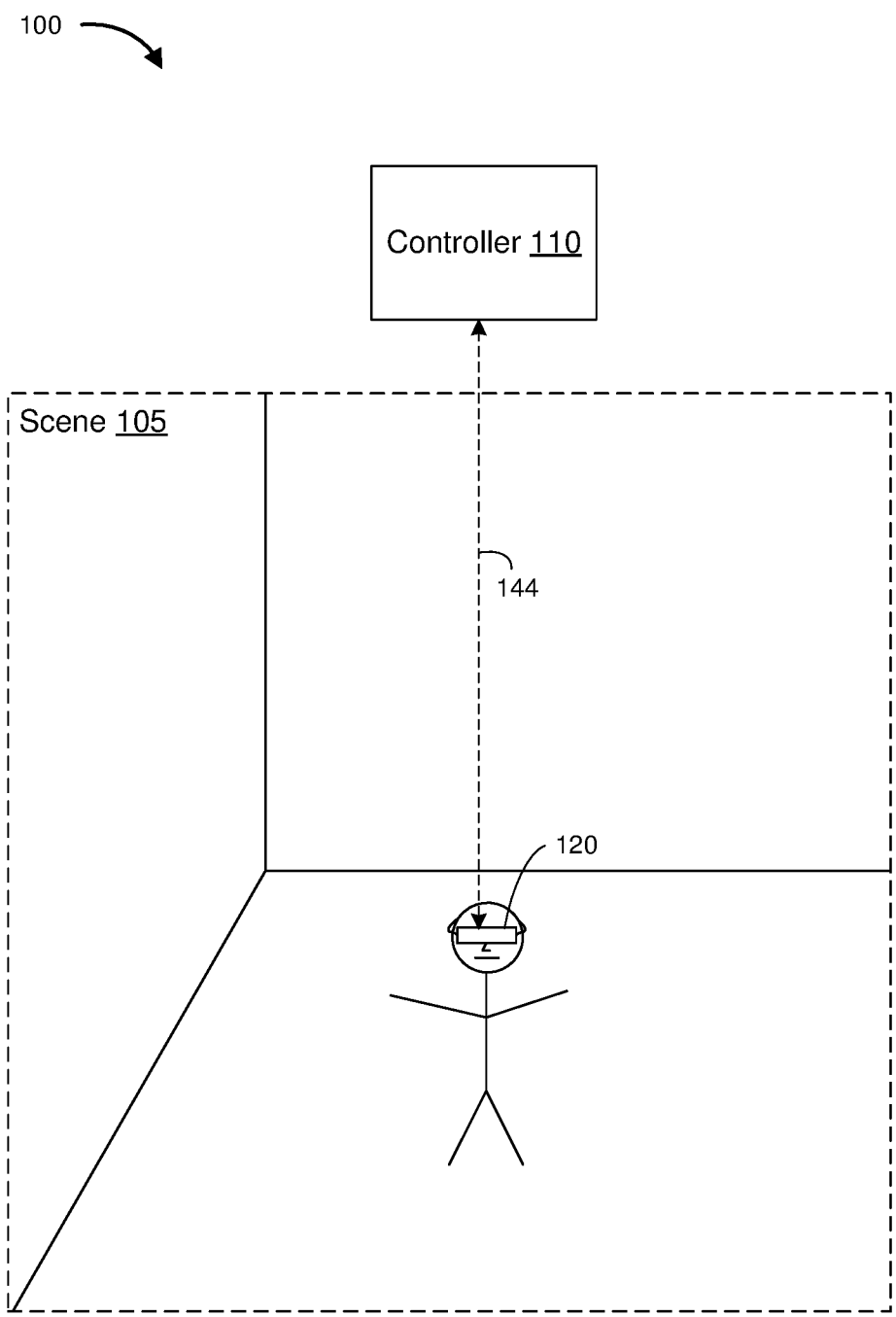
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating a dense depth map. In various implementations, the method is performed at a device including one or more processors, non-transitory memory, and a scene camera. The method includes obtaining an image of a scene including a plurality of pixels at a respective plurality of pixel locations and having a respective plurality of pixel values. The method includes determining a first set of pixels locations corresponding to a 2D boundary surrounding an object represented in the image. The method includes determining, based on the first set of pixel locations, a second set of pixel locations corresponding to a 3D boundary surrounding the object.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

Description

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In various implementations, a device surveys a scene using a scene camera and detects objects within the scene represented by an image captured by the scene camera. Further, the device determines the orientation of the object. This orientation information can be used in a variety of applications, e.g., place virtual objects in the scene. Increasing the accuracy of this orientation information and the speed at which it is obtained improves the user experience of such applications.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an HMD 120.

In some implementations, the controller 110 is configured to manage and coordinate a CGR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In various implementations, the scene 105 is a physical environment. In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.). In another example, the controller 110 is included within the enclosure of HMD 120.

In some implementations, the HMD 120 is configured to provide the CGR experience to the user. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

According to some implementations, the HMD 120 provides a CGR experience to the user while the user is virtually and/or physically present within the scene 105. In some implementations, while presenting an AR experience, the HMD 120 is configured to present AR content (e.g., one or more virtual objects) and to enable optical see-through of the scene 105. In some implementations, while presenting an AR experience, the HMD 120 is configured to present AR content (e.g., one or more virtual objects) overlaid or otherwise combined with images or portions thereof captured by the scene camera of HMD 120. In some implementations, while presenting AV content, the HMD 120 is configured to present elements of the real world, or representations thereof, combined with or superimposed over a user's view of a computer-simulated environment. In some implementations, while presenting a VR experience, the HMD 120 is configured to present VR content.

In some implementations, the user wears the HMD 120 on his/her head. As such, the HMD 120 includes one or more CGR displays provided to display the CGR content. For example, in various implementations, the HMD 120 encloses the field-of-view of the user. In some implementations, the HMD 120 is replaced with a handheld device (such as a smartphone or tablet) configured to present CGR content, and rather than wearing the HMD 120 the user holds the device with a display directed towards the field-of-view of the user and a camera directed towards the scene 105. In some implementations, the handheld device can be placed within an enclosure that can be worn on the head of the user. In some implementations, the HMD 120 is replaced with a CGR chamber, enclosure, or room configured to present CGR content in which the user does not wear or hold the HMD 120.

Figure 2:
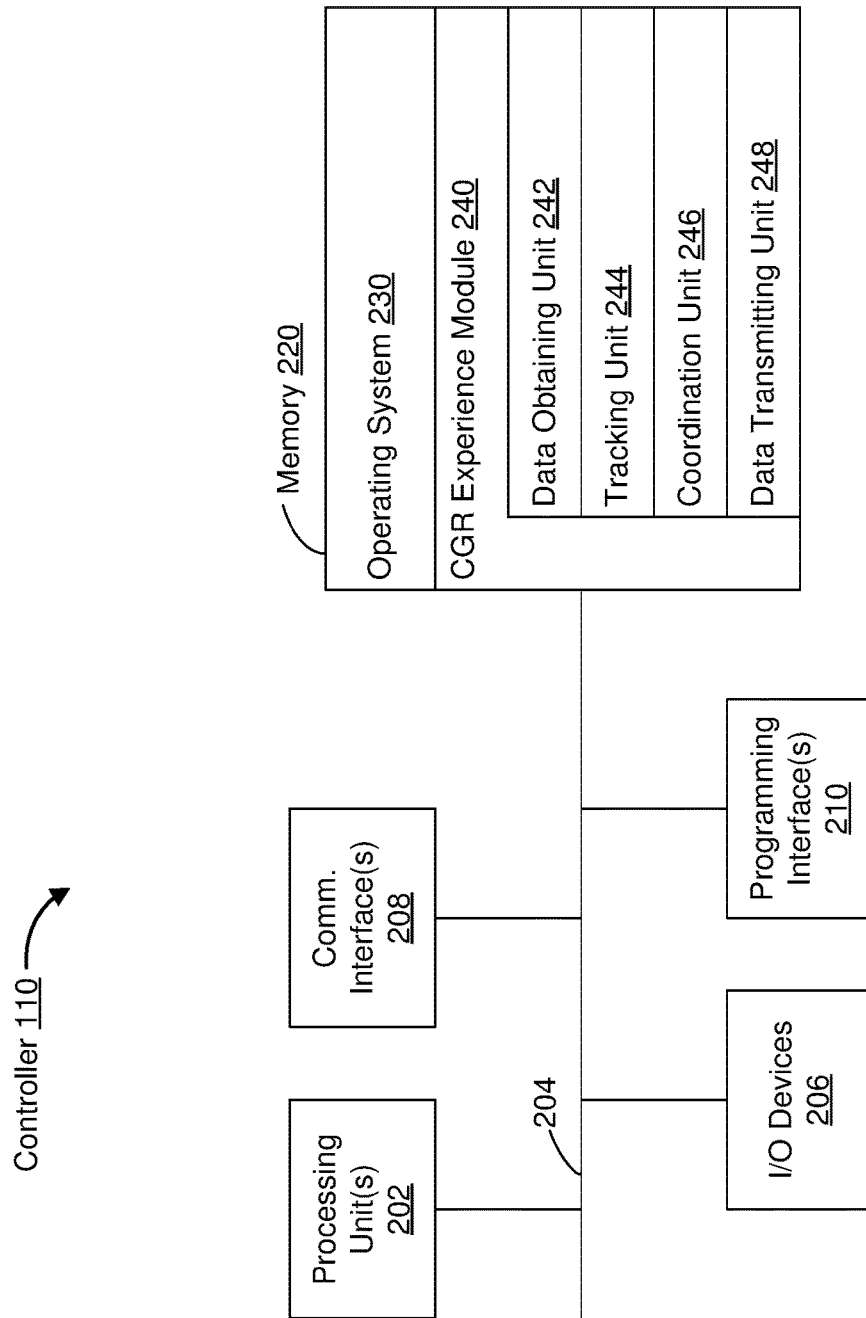
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR experience module 240.

The operating system 230 includes procedures for handling various basic system services and for performing hardware dependent tasks. In some implementations, the CGR experience module 240 is configured to manage and coordinate one or more CGR experiences for one or more users (e.g., a single CGR experience for one or more users, or multiple CGR experiences for respective groups of one or more users). To that end, in various implementations, the CGR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the CGR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
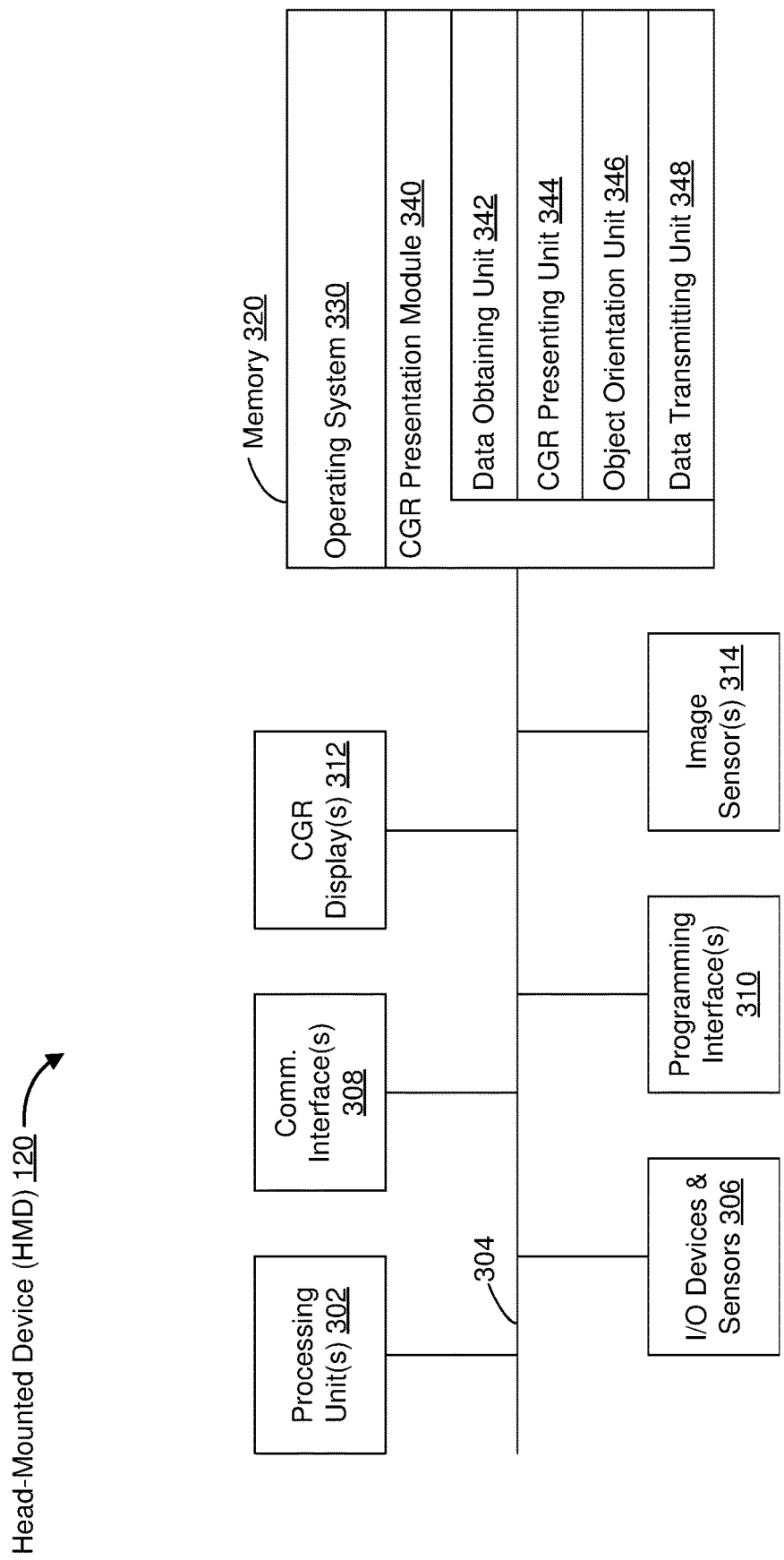
FIG. 3 is a block diagram of an example HMD in accordance with some implementations.

FIG. 3 is a block diagram of an example of the HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more CGR displays 312 are configured to provide the CGR experience to the user. In some implementations, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some implementations, the one or more CGR displays 312 are capable of presenting AR and VR content. In some implementations, the one or more CGR displays 312 are capable of presenting AR or VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation module 340.

The operating system 330 includes procedures for handling various basic system services and for performing hardware dependent tasks. In some implementations, the CGR presentation module 340 is configured to present CGR content to the user via the one or more CGR displays 312. To that end, in various implementations, the CGR presentation module 340 includes a data obtaining unit 342, a CGR presenting unit 344, an object orientation unit 346, and a data transmitting unit 348.

In some implementations, the data obtaining unit 342 is configured to obtain data (e.g., presentation data, interaction data, sensor data, location data, etc.) from at least the controller 110. To that end, in various implementations, the data obtaining unit 342 includes instructions and/or logic therefor, and heuristics and metadata therefor.

In some implementations, the CGR presenting unit 344 is configured to present CGR content via the one or more CGR displays 312. To that end, in various implementations, the CGR presenting unit 344 includes instructions and/or logic therefor, and heuristics and metadata therefor.

In some implementations, the object orientation unit 346 is configured to estimate the orientation of one or more objects in a scene based on one or more images of the scene (e.g., captured using a scene camera of the one or more image sensors 314). To that end, in various implementations, the object orientation unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the CGR presenting unit 344, the object orientation unit 346, and the data transmitting unit 348 are shown as residing on a single device (e.g., the HMD 120), it should be understood that in other implementations, any combination of the data obtaining unit 342, the CGR presenting unit 344, the object orientation unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
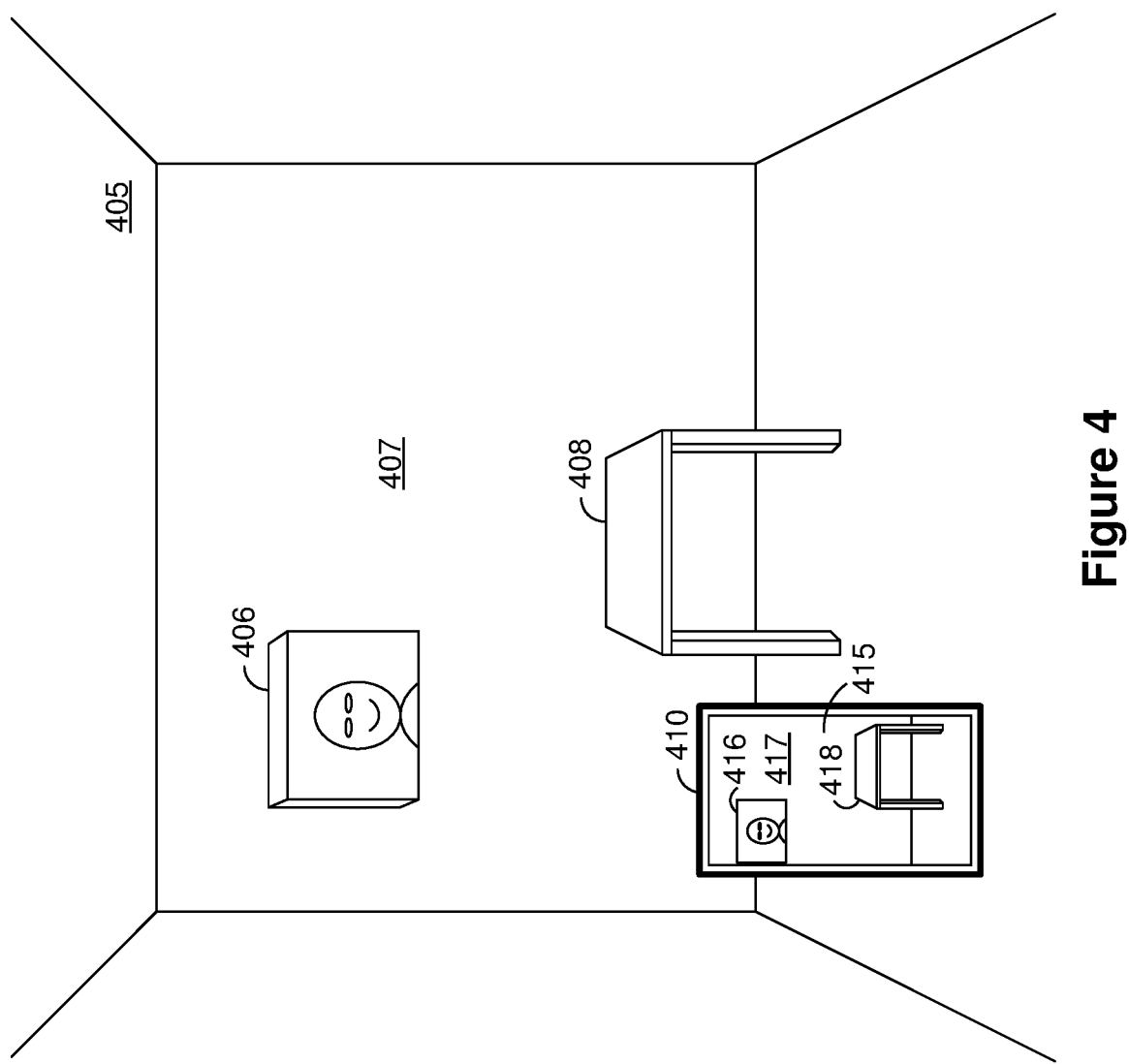
FIG. 4 illustrates a scene with a handheld electronic device surveying the scene.

FIG. 4 illustrates a scene 405 with a handheld electronic device 410 surveying the scene 405. The scene 405 includes a television 406 hanging on a wall 407 and a table 408.

The handheld electronic device 410 displays, on a display, a representation of the scene 415 including a representation of the television 416 hanging on a representation of the wall 417 and a representation of the table 418. In various implementations, the representation of the scene 415 is generated based on an image of the scene captured with a scene camera of the handheld electronic device 410 having a field-of-view directed toward the scene 405.

Figure 5A:
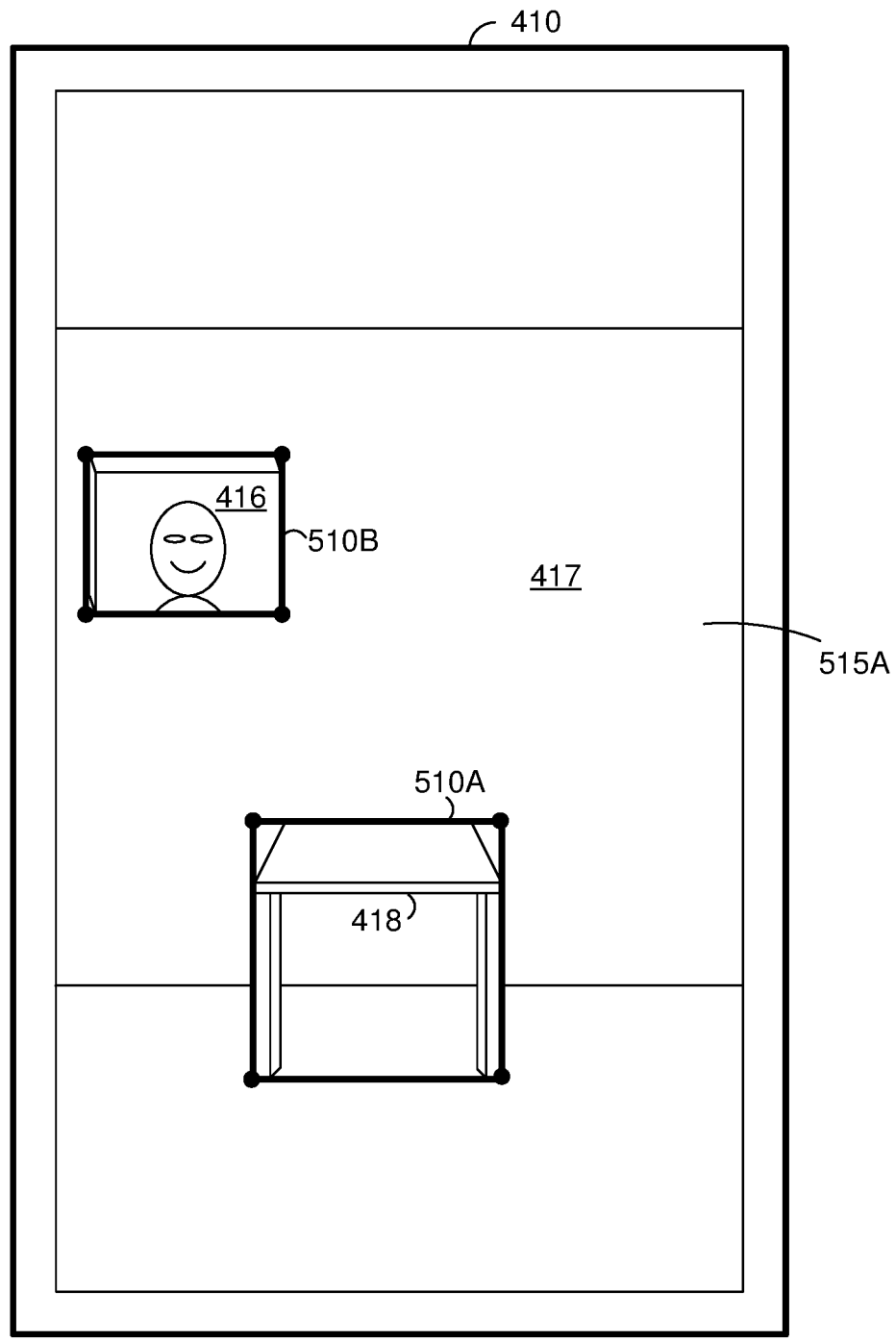
FIG. 5A illustrates the handheld electronic device of FIG. 4 displaying a first image of the scene captured from a first perspective and bounding rectangles.

FIG. 5A illustrates the handheld electronic device 410 displaying a first image 515A of the scene 405 captured from a first perspective. The first image 515A of the scene 405 includes the representation of the television 416 hanging on the representation of the wall 417 and the representation of the table 418.

An image includes a matrix of pixels, each pixel having a corresponding pixel value and a corresponding pixel location. In various implementations, the pixel values range from 0 to 255. In various implementations, each pixel value is a color triplet including three values corresponding to three color channels. For example, in one implementation, an image is an RGB image and each pixel value includes a red value, a green value, and a blue value. As another example, in one implementation, an image is a YUV image and each pixel value includes a luminance value and two chroma values. In various implementations, the image is a YUV444 image in which each chroma value is associated with one pixel. In various implementations, the image is a YUV420 image in which each chroma value is associated with a 2×2 block of pixels (e.g., the chroma values are downsampled). While specific image formats are provided, it should be appreciated that pixel formats may be used.

Accordingly, in various implementations, the first image 515A includes a plurality of pixels at a respective plurality of pixel locations and having a respective plurality of pixel values.

FIG. 5A further illustrates the handheld electronic device 410 displaying a first bounding rectangle 510A surrounding the representation of the table 418 and a second bounding rectangle 510B surrounding the representation of the television 416. In various implementations, the handheld electronic device 410 detects one or more objects in the first image 515A and, for each object detected, determines a first set of pixels locations corresponding to a 2D boundary surrounding the object. Thus, in various implementations, the handheld electronic device 410 determines a first set of pixel locations corresponding to the corners of the first bounding rectangle 510A and determines a first set of pixel locations corresponding to the corners of the second bounding rectangle 510B.

In various implementations, determining the first set of pixel locations includes applying a first neural network to the image. In various implementations, the first neural network includes an interconnected group of nodes. In various implementations, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the first neural network is trained on training data to set the weights.

In various implementations, the first neural network includes a first deep learning neural network. Accordingly, in some implementations, the first neural network includes a plurality of layers (of nodes) between an input layer (of nodes) and an output layer (of nodes). In various implementations, the first neural network receives, as an input, an image. In various implementations, the first neural network provides, as outputs, first sets of pixel locations of the image corresponding to a 2D boundary surrounding a detected object. Accordingly, in various implementations, the first neural network is an object detection neural network.

Figure 5B:
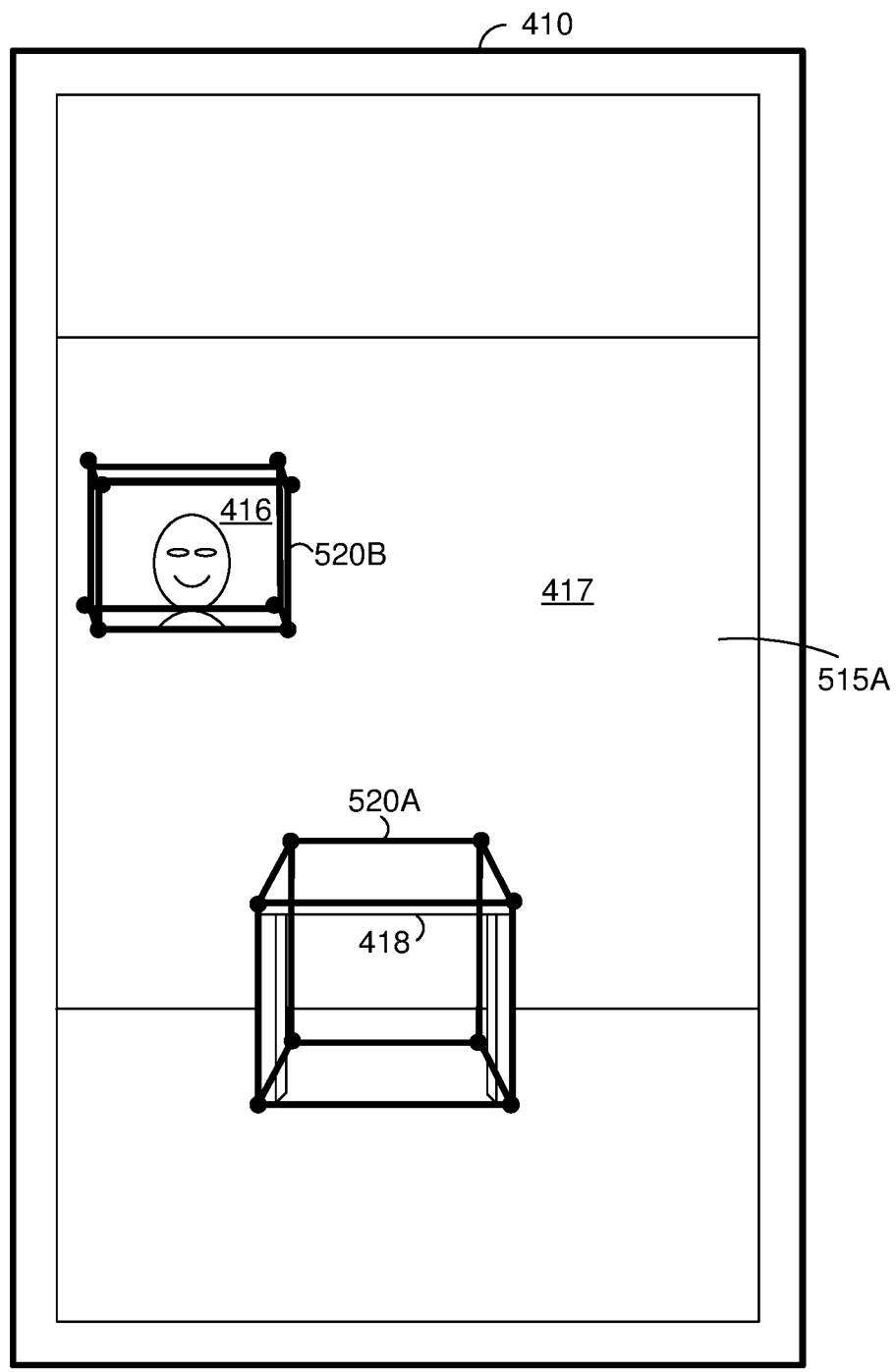
FIG. 5B illustrates the handheld electronic device of FIG. 4 displaying the first image of the scene and bounding prisms.

FIG. 5B illustrates the handheld electronic device 410 displaying the first image 515A of the scene 405. FIG. 5B further illustrates the handheld electronic device 410 displaying a first bounding prism 520A surrounding the representation of the table 418 and a second bounding prism 520B surrounding the representation of the television 416. In various implementations, the handheld electronic device 410, for each detected object, determines a second set of pixel locations corresponding to a 3D boundary surrounding the object based on the first set of pixel locations corresponding to a 2D boundary surrounding each object. Thus, in various implementations, the handheld electronic device 410 determines a second set of pixel locations corresponding to the vertices of the first bounding prism 520A and determines a second set of pixel locations corresponding to the vertices of the second bounding prism 520B.

In various implementations, determining the second set of pixel locations includes applying a second neural network to the image. In various implementations, the second neural network is independent of the first neural network. In various implementations, the second neural network includes an interconnected group of nodes. In various implementations, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the second neural network is trained on training data to set the weights.

In various implementations, the second neural network includes a second deep learning neural network. Accordingly, in some implementations, the second neural network includes a plurality of layers (of nodes) between an input layer (of nodes) and an output layer (of nodes). In various implementations, the second neural network receives, as inputs, the image and first sets of pixel locations of the image corresponding to a 2D boundary surrounding detected objects. In various implementations, the first neural network provides, as outputs, second sets of pixel locations of the image corresponding to a 3D boundary surrounding a detected object. Accordingly, in various implementations, the second neural network is an object orientation estimation neural network.

The first set of pixel locations corresponding to a 2D boundary surrounding an object and the second set of pixel locations corresponding to a 3D boundary surrounding the object are both sets of 2D locations, e.g., pixel locations of an image. In various implementations, the handheld electronic device 410 determines a first set of 3D coordinates corresponding to the second set of pixel locations. In various implementations, the handheld electronic device 410 determines the first set of 3D coordinates by applying a Perspective-N-point algorithm to the second set of pixel locations.

In various implementations, the first set of 3D coordinates are not mapped to the scene 405. Thus, in various implementations, the handheld electronic device 410 maps the first set of 3D coordinates to a CGR coordinate system of the scene 405. Accordingly, in various implementations, the handheld electronic device 410 determines a second set of 3D coordinates in a CGR coordinate system corresponding to the first set of 3D coordinates.

In various implementations, the handheld electronic device 410 generates a point cloud based on an image of the scene obtained by a scene camera. In various implementations, the point cloud includes a plurality of three-dimensional points in the CGR coordinate system. In various implementations, the CGR coordinate system is gravity-aligned such that one of the coordinates (e.g., the z-coordinate) extends opposite the direction of a gravity vector. The gravity vector may be obtained by an accelerometer of the handheld electronic device 410. Each point in the point cloud represents a point on a surface of the scene 405, such as a point on the wall 407, the floor, the top of the table 408, or the legs of the table 408. In various implementations, the point cloud is obtained using VIO (visual inertial odometry) and/or a depth sensor. In various implementations, the point cloud is based on the image of the scene and previous images of the scene 405 taken at different angles to provide stereoscopic imaging. In various implementations, a point in the point cloud is associated with metadata, such as a color, texture, reflectance, or transmittance of the point on the surface in the scene or a confidence in the position of the point on the surface in the scene 405. In various implementations, one or more points in the point cloud correspond to a respective one or more lines detected in an image of the scene. For example, in some embodiments, when a line is detected, the midpoint of the line is added to the point cloud. In some embodiments, one or both endpoints of the line are alternatively or additionally added to the point cloud.

Accordingly, in various implementations, the handheld electronic device 410 stores a point cloud in a CGR coordinate system and maps the first set of 3D coordinates (corresponding to an object detected in the scene) to the CGR coordinate system to generate a second set of 3D coordinates in the CGR coordinate system.

In various implementations, the point cloud is further used to assist in the mapping. For example, in various implementations, the handheld electronic device 410 defines, based on the point cloud, surfaces (e.g., planes) in the CGR coordinate system corresponding to surfaces in the scene 405. In various implementations, the handheld electronic device 410 determines the second set of 3D coordinates in the CGR coordinate system based on one or more defined surfaces in the CGR coordinate system. For example, a first set of 3D coordinates corresponding to a bounding prism close to a detected surface of a floor is mapped to the 3D coordinates of the floor. As another example, the first set of 3D coordinates corresponding to the top of the representation of the table 418 is mapped to a detected surface of the top of the table 408. As another example, the first set of 3D coordinates corresponding to the back of the representation of the television 416 is mapped to a detected surface of the wall 407.

Figure 5C:
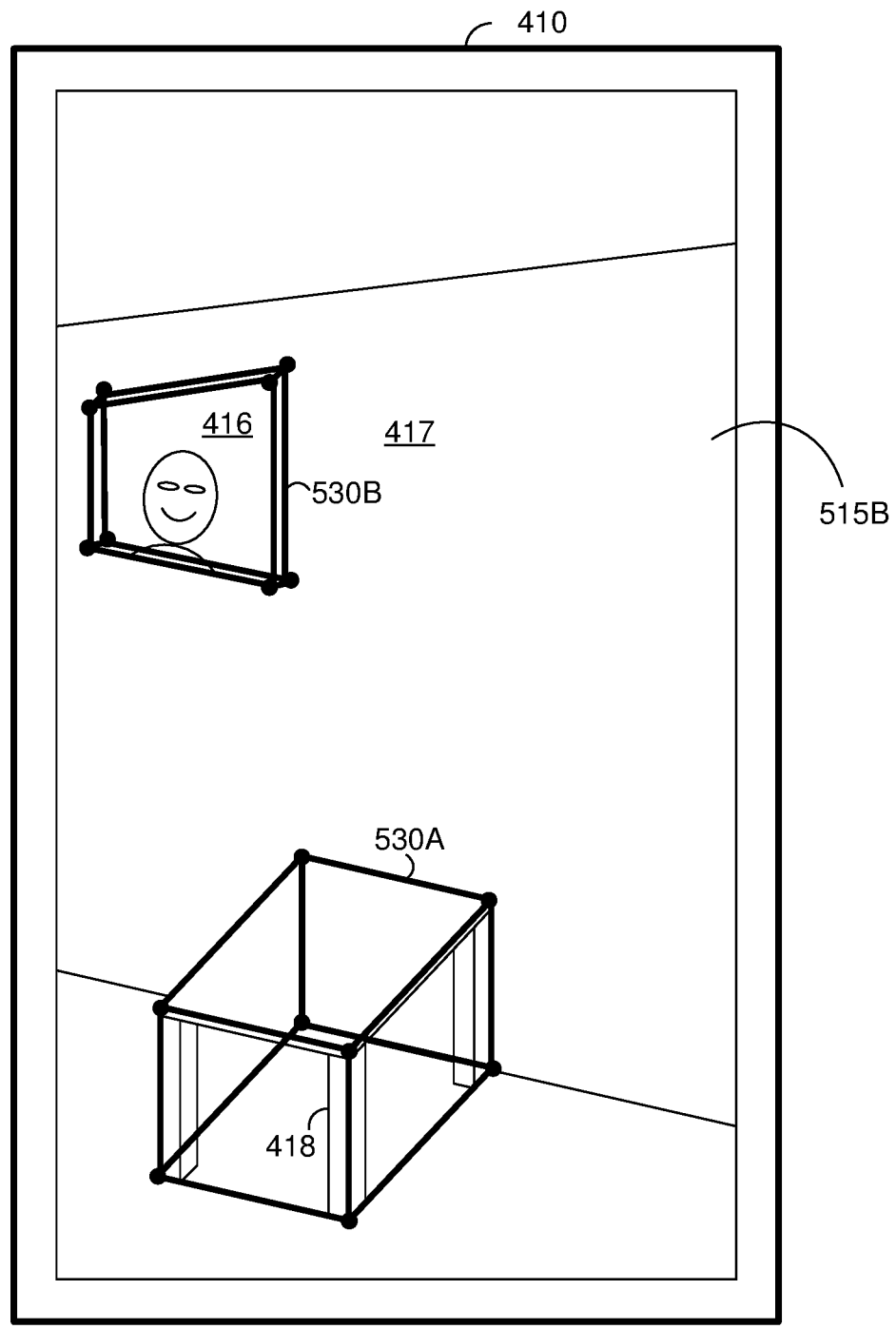
FIG. 5C illustrates the handheld electronic device of FIG. 4 displaying a second image of the scene captured from a second perspective.

FIG. 5C illustrates the handheld electronic device 410 displaying a second image 515B of the scene 405 captured from a second perspective. The second image 515B of the scene 405 includes the representation of the television 416 hanging on the representation of the wall 417 and the representation of the table 418.

FIG. 5C further illustrates the handheld electronic device 410 displaying two virtual objects, a first virtual box 530A and a second virtual box 530B. As the electronic device 410 moves about the scene 405, the representation of the scene 415 changes in accordance with the change in perspective of the electronic device 410. Further, the first virtual box 530A and the second virtual box 530B correspondingly change in accordance with the change in perspective of the electronic device 410. Accordingly, as the electronic device 410 moves, the first virtual box 530A appears in a fixed relationship with respect to the representation of the table 418 and the second virtual box 530B appears in a fixed relationship to the representation of the television 416.

The first virtual box 530A has vertices at the second set of 3D coordinates in the CGR coordinate system corresponding to the representation of the table 418. Accordingly, the first virtual box 530A appears to surround the representation of the table 418. The second virtual box 530B has vertices at the second set of 3D coordinates in the CGR coordinate system corresponding to the representation of the television 416. Accordingly, the second virtual box 530B appears to surround the representation of the television 416.

Figure 6:
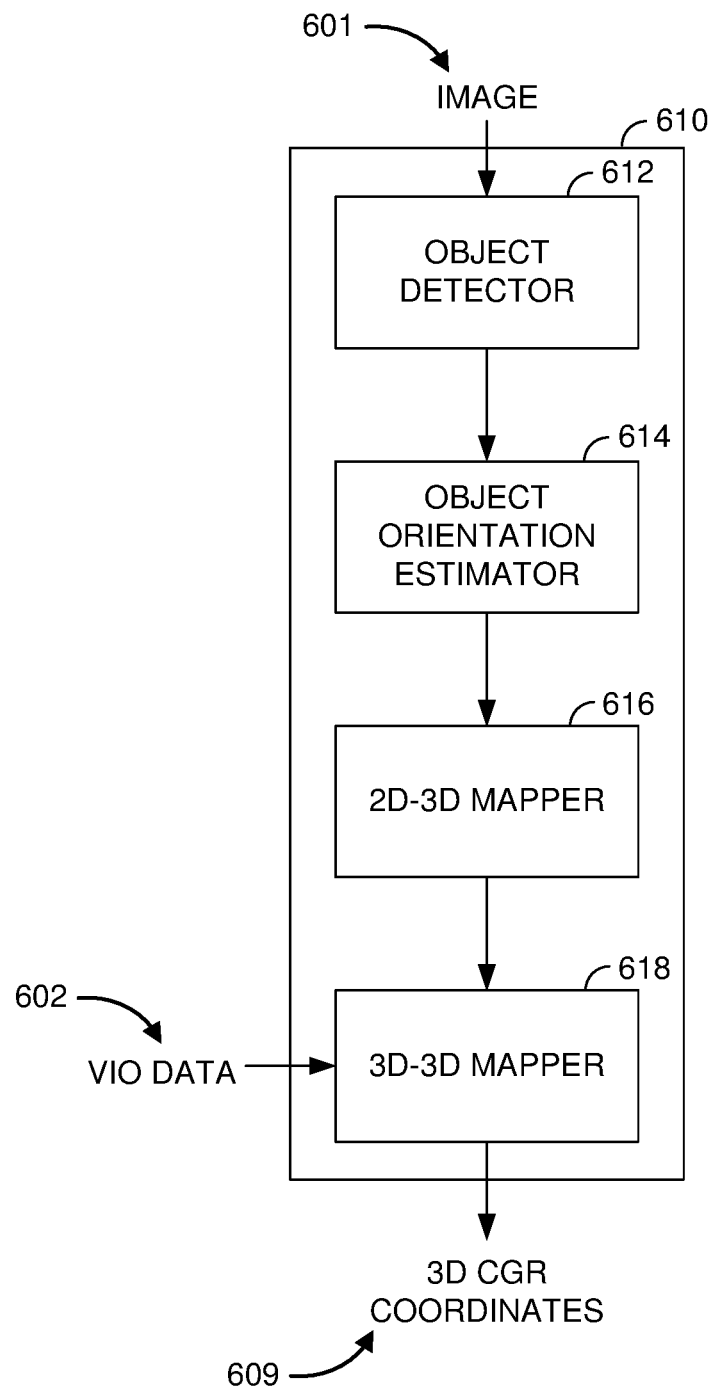
FIG. 6 illustrates an object orientation system in accordance with some embodiments.

FIG. 6 illustrates an object orientation system 610. The object orientation system 610 receives, as inputs, an image 601 of a scene and VIO data 602 in a CGR coordinate system. The object orientation system 610 produces, as an output, one or more sets of 3D coordinates in the CGR coordinate system corresponding to the locations of objects in the CGR coordinate system.

The object orientation system 610 includes an object detector 612 which receives the image 601 and determines a first set of pixel locations corresponding to a 2D boundary surrounding an object represented in the image. In various implementations, the object detector 612 determines a first set of pixel locations corresponding to the corners of a rectangle surrounding an object represented in the image.

In various implementations, the object detector 612 includes a first neural network (e.g., an object detection neural network). In various implementations, the object detector 612 includes a first deep neural network.

The object orientation system 610 includes an object orientation estimator 614 which receives the image 601 and the first set of pixel locations from the object detector 612 and determines, based on the first set of pixel locations, a second set of pixel locations corresponding to a 3D boundary surrounding the object. In various implementations, the object orientation estimator 614 determines a second set of pixel locations corresponding to the vertices of a prism surrounding the object. In various implementations, the second set of pixel locations includes at least one of the first set of pixel locations. In various implementations, the second set of pixel locations includes at least two of the first set of pixel locations. In various implementations, the second set of pixel locations includes one or more pixel locations on a line between two of the first set of pixel locations. In various implementations, the second set of pixel locations includes two or more pixel locations on a line between two of the first set of pixel locations.

In various implementations, the object orientation estimator 614 includes a second neural network (e.g., an object orientation estimation neural network). In various implementations, the object orientation estimator 614 includes a second deep neural network.

The object orientation system 610 includes a 2D-3D mapper 616 which receives the second set of pixel locations from the object orientation estimator 614 and determines a first set of 3D coordinates corresponding to the second set of pixel locations. In various implementations, the 2D-3D mapper 616 applies a Perspective-N-Point algorithm to the second set of pixel locations to determine the first set of 3D coordinates.

The object orientation system 610 includes a 3D-3D mapper 618 which receives the VIO data 602 in the CGR coordinate system and the first set of 3D coordinates from the 2D-3D mapper 616 and determines a second set of 3D coordinates in the CGR coordinate system corresponding to the first set of 3D coordinates. In various implementations, the 3D-3D mapper 618 determines the second set of 3D coordinates in the CGR coordinate system based on one or more defined surfaces in the CGR coordinate system (e.g., moving the bottom of a box to the floor, moving the side of a box against a wall, or moving the top of a box to align with the top of a table or other object.

In various implementations, in addition to determining the first set of pixel locations corresponding to a 2D boundary surrounding an object represented in the image, the object detector 612 determines a label for the object (e.g., a chair, a table, a television, etc.). Accordingly, in various implementations, the output of the object orientation system 610 is one or more labeled sets of 3D coordinates in the CGR coordinate system.

Figure 7:
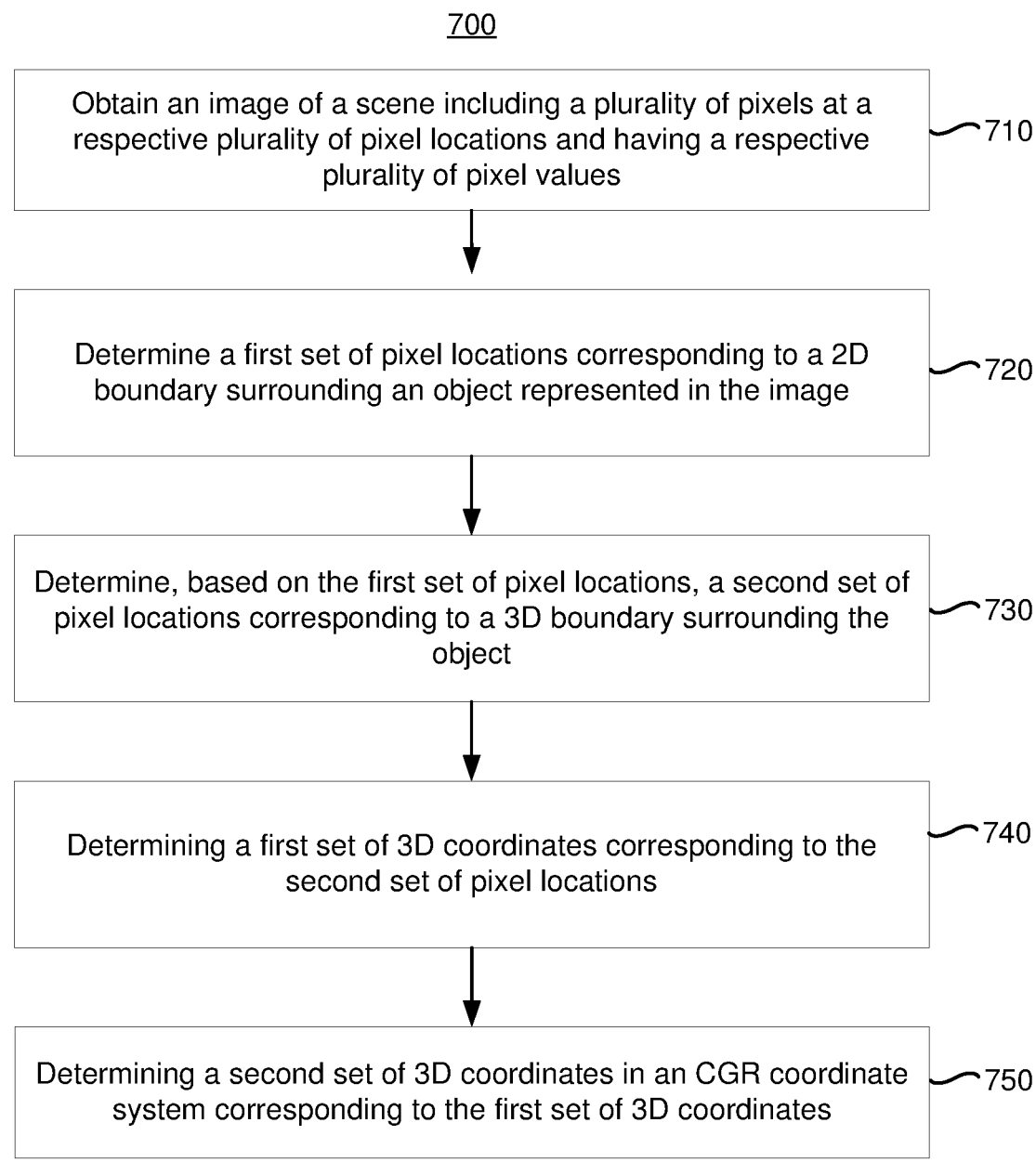
FIG. 7 is a flowchart representation of a method of estimating the orientation of an object in accordance with some implementations.

FIG. 7 is a flowchart representation of a method 700 of estimating the orientation of an object in accordance with some implementations. In various implementations, the method 700 is performed by a device with one or more processors, non-transitory memory, and a scene camera (e.g., the HMD 120 of FIG. 3 or the handheld electronic device 410 of FIG. 4). In some implementations, the method 700 is performed by processing logic, including hardware, firmware, software, or a combination thereof (e.g., the object orientation system 610 of FIG. 6). In some implementations, the method 700 is performed by a processor executing instructions (e.g., code) stored in a non-transitory computer-readable medium (e.g., a memory). Briefly, in some circumstances, the method 700 includes determining a first set of pixels locations corresponding to a 2D boundary surrounding an object represented in an image and determining, based on the first set of pixel locations, a second set of pixel locations corresponding to a 3D boundary surrounding the object.

The method 700 begins, in block 710, with the device obtaining an image of a scene including a plurality of pixels at a respective plurality of pixel locations and having a respective plurality of pixel values. For example, in FIG. 5A, the handheld electronic device 410 displays a first image 515A of a scene 405.

The method 700 continues, at block 720, with the device determining a first set of pixel locations corresponding to a 2D boundary surrounding an object represented in the image. For example, in FIG. 5A, the handheld electronic device 410 displays a first bounding rectangle 510A surrounding the representation of the table 418 and a second bounding rectangle 510B surrounding the representation of the television 416.

In various implementations, determining the first set of pixel locations includes applying a first neural network (e.g., an object detection neural network) to the image. In various implementations, the first neural network is a deep neural network.

In various implementations, determining the first set of pixel locations includes determining a first set of pixel locations corresponding to the corners of a rectangle surrounding an object represented in the image.

In various implementations, determining the first set of pixel locations further includes determining a label for the object.

The method 700 continues, at block 730, with the device determining, based on the first set of pixel locations (and, optionally, the image), a second set of pixel locations corresponding to a 3D boundary surrounding the object. For example, in FIG. 5B, the handheld electronic device 410 displays a first bounding prism 520A surrounding the representation of the table 418 and a second bounding prism 520B surrounding the representation of the television 416.

In various implementations, determining the second set of pixel locations includes applying a second neural network (e.g., an object orientation estimation neural network), independent of the first neural network, to the first set of pixel locations and, optionally, at least a portion of the image (e.g., a portion of the image indicated by the first set of pixel locations). In various implementations, the second neural network is a deep neural network.

In various implementations, determining the second set of pixel locations includes determining a second set of pixel locations corresponding to the vertices of a prism surrounding the object.

In various implementations, the second set of pixel locations includes at least one of the first set of pixel locations. In various implementations, the second set of pixel locations includes at least two of the first set of pixel locations. In various implementations, the second set of pixel locations includes one or more pixel locations on a line between two of the first set of pixel locations. In various implementations, the second set of pixel locations includes two or more pixel locations on a line between two of the first set of pixel locations.

The method 700 continues, at block 740, with the device determining a first set of 3D coordinates corresponding to the second set of pixel locations. For example, in various implementations, the device applies a Perspective-N-Point algorithm to the second set of pixel locations.

The method 700 continues, at block 750, with the device determining a second set of 3D coordinates in a CGR coordinate system corresponding to the first set of 3D coordinates. In various implementations, determining the second set of 3D coordinates in the CGR coordinate system is based on one or more defined surfaces in the CGR coordinate system.

In various implementations, the method 700 further includes displaying a representation of the 3D boundary surrounding the object. For example, in FIG. 5C, the handheld electronic device 410 displays a first virtual box 530A having vertices at the second set of 3D coordinates in the CGR coordinate system corresponding to the representation of the table 418 and a second virtual box 530B having vertices at the second set of 3D coordinates in the CGR coordinate system corresponding to the representation of the television 416.

In various implementations, the method 700 includes determining a third set of pixel locations corresponding to a 2D boundary surrounding a second object represented in the image and determining, based on the third set of pixel locations, a fourth set of pixel locations corresponding to a 3D boundary surrounding the second object. Thus, in various implementations, the method 700 includes estimating the orientation of multiple objects represented in a single image.

In various implementations, the method 700 includes obtaining a second image of the scene including a plurality of second pixels at a respective plurality of second pixel locations and having a respective plurality of second pixel values. The method 700 then includes determining a first set of second pixel locations corresponding to a 2D boundary surrounding the object represented in the second image and determining, based on the third set of pixel locations, a second set of second pixel locations corresponding to a 3D boundary surrounding the object. Thus, the object can be detected in multiple images, from multiple perspectives, to increase confidence in the estimation of the orientation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    obtaining an image of a scene including a plurality of pixels at a respective plurality of pixel locations and having a respective plurality of pixel values;
    determining a first set of pixel locations corresponding to a 2D boundary surrounding an object represented in the image;
    determining, based on the first set of pixel locations, a second set of pixel locations corresponding to a 3D boundary surrounding the object; and
    determining, based on the second set of pixel locations, a first set of 3D coordinates corresponding to the second set of pixel locations.

2. The method of claim 1, wherein determining the first set of pixel locations includes applying a first neural network to the image and wherein determining the second set of pixel locations includes applying a second neural network, independent of the first neural network, to the first set of pixel locations.

3. The method of claim 2, wherein the first neural network is a first deep learning neural network and the second neural network is a second deep learning neural network.

4. The method of claim 1, wherein determining the first set of pixel locations includes determining a first set of pixel locations corresponding to the corners of a rectangle surrounding the object and determining the second set of pixel locations includes determining a second set of pixel locations corresponding to the vertices of a prism surrounding the object.

5. The method of claim 1, wherein determining the first set of 3D coordinates corresponding to the second set of pixel locations includes applying a Perspective-N-Point algorithm to the second set of pixel locations.

6. The method of claim 1, further comprising determining a second set of 3D coordinates in a computer-generated reality (CGR) coordinate system corresponding to the first set of 3D coordinates.

7. The method of claim 6, further comprising wherein determining the second set of 3D coordinates in the CGR coordinate system is based on one or more defined surfaces in the CGR coordinate system.

8. The method of claim 1, further comprising displaying a representation of the 3D boundary surrounding the object.

9. The method of claim 1, wherein determining the first set of pixel locations further includes determining a label for the object.

10. The method of claim 1, further comprising:
determining a third set of pixel locations corresponding to a 2D boundary surrounding a second object represented in the image; and
determining, based on the third set of pixel locations, a fourth set of pixel locations corresponding to a 3D boundary surrounding the second object.

11. The method of claim 1, further comprising:
obtaining a second image of the scene including a plurality of second pixels at a respective plurality of second pixel locations and having a respective plurality of second pixel values;
determining a first set of second pixel locations corresponding to a 2D boundary surrounding the object represented in the second image; and
determining, based on the first set of pixel locations, a second set of second pixel locations corresponding to a 3D boundary surrounding the object.

12. The method of claim 1, wherein the second set of pixel locations are the output of a neural network applied to the first set of pixel locations.

13. A device comprising:
one or more scene cameras to obtain an image of a scene including a plurality of pixels at a respective plurality of pixel locations and having a respective plurality of pixel values; and
one or more processors to:
determine a first set of pixels locations corresponding to a 2D boundary surrounding an object represented in the image;
determine, based on the first set of pixel locations, a second set of pixel locations corresponding to a 3D boundary surrounding the object; and
determine, based on the second set of pixel locations, a first set of 3D coordinates corresponding to the second set of pixel locations.

14. The device of claim 13, wherein the one or more processors are to determine the first set of pixel locations by applying a first neural network to the image and wherein determining the second set of pixel locations includes applying a second neural network, independent of the first neural network, to the first set of pixel locations.

15. The device of claim 13, wherein the one or more processors are to determine the first set of pixel locations by determining a first set of pixel locations corresponding to the corners of a rectangle surrounding the object and determining the second set of pixel locations includes determining a second set of pixel locations corresponding to the vertices of a prism surrounding the object.

16. The device of claim 13, wherein the one or more processors are to determine the first set of 3D coordinates corresponding to the second set of pixel locations by applying a Perspective-N-Point algorithm to the second set of pixel locations.

17. The device of claim 13, wherein the one or more processors are further to display a representation of the 3D boundary surrounding the object.

18. The device of claim 13, wherein the one or more processors are further to determine a label for the object.

19. A non-transitory computer-readable medium having instructions encoded thereon which, when executed by one or more processors of a device including a scene camera, cause the device to:
obtain an image of a scene including a plurality of pixels at a respective plurality of pixel locations and having a respective plurality of pixel values;
determine a first set of pixel locations corresponding to a 2D boundary surrounding an object represented in the image;
determine, based on the first set of pixel locations, a second set of pixel locations corresponding to a 3D boundary surrounding the object; and
determine, based on the second set of pixel locations, a first set of 3D coordinates corresponding to the second set of pixel locations.

20. The device of claim 13, wherein the second set of pixel location are the output of a neural network applied to the first set of pixel locations.

* * * * *